United States Patent
Thomas

(10) Patent No.: US 7,487,946 B2
(45) Date of Patent: Feb. 10, 2009

(54) SLIDING/ADJUSTING CONTAINER HOLDER

(75) Inventor: Gregory Paul Thomas, Canton, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 62 days.

(21) Appl. No.: 11/094,348

(22) Filed: Mar. 31, 2005

(65) Prior Publication Data

US 2006/0237612 A1    Oct. 26, 2006

(51) Int. Cl.
*B60N 3/00* (2006.01)

(52) U.S. Cl. .................. 248/311.2; 248/309.1; 224/281; 224/562

(58) Field of Classification Search .............. 248/311.2, 248/309.1; 224/926, 281, 552
See application file for complete search history.

(56) References Cited

U.S. PATENT DOCUMENTS

| | | | |
|---|---|---|---|
| 5,520,313 A * | 5/1996 | Toshihide | 224/539 |
| 6,039,296 A | 3/2000 | Nishina et al. | |
| 6,059,243 A * | 5/2000 | Hikage et al. | 248/311.2 |
| 6,152,512 A * | 11/2000 | Brown et al. | 296/37.12 |
| 6,915,997 B2 * | 7/2005 | Nakaya | 248/311.2 |
| 6,929,295 B2 * | 8/2005 | Nurenberg et al. | 292/336.3 |
| 6,942,267 B1 * | 9/2005 | Sturt | 296/24.34 |

* cited by examiner

*Primary Examiner*—Korie Chan
*Assistant Examiner*—Steven Marsh
(74) *Attorney, Agent, or Firm*—Foley & Lardner LLP

(57) ABSTRACT

A container holder for a vehicle includes a container bin unit with a cavity and a size adjustment mechanism. The cavity has a first portion and a second portion. The adjustment mechanism includes a dual adjustment piece and a single adjustment piece, which are movable between at least a retracted and extended position. When in the extended position, the dual or single adjustment pieces extend into the first portion and/or second portion of the cavity to adjust the diameter of the portions. The adjustment pieces allow for the container holder to adequately hold one small container and one large container, two small containers, or two large containers.

30 Claims, 5 Drawing Sheets

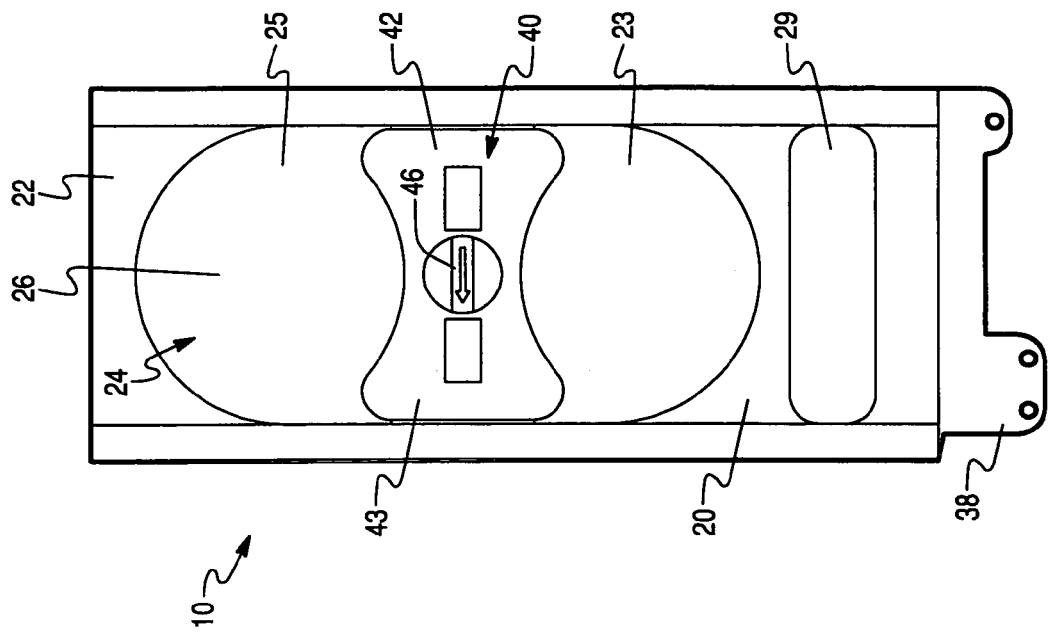
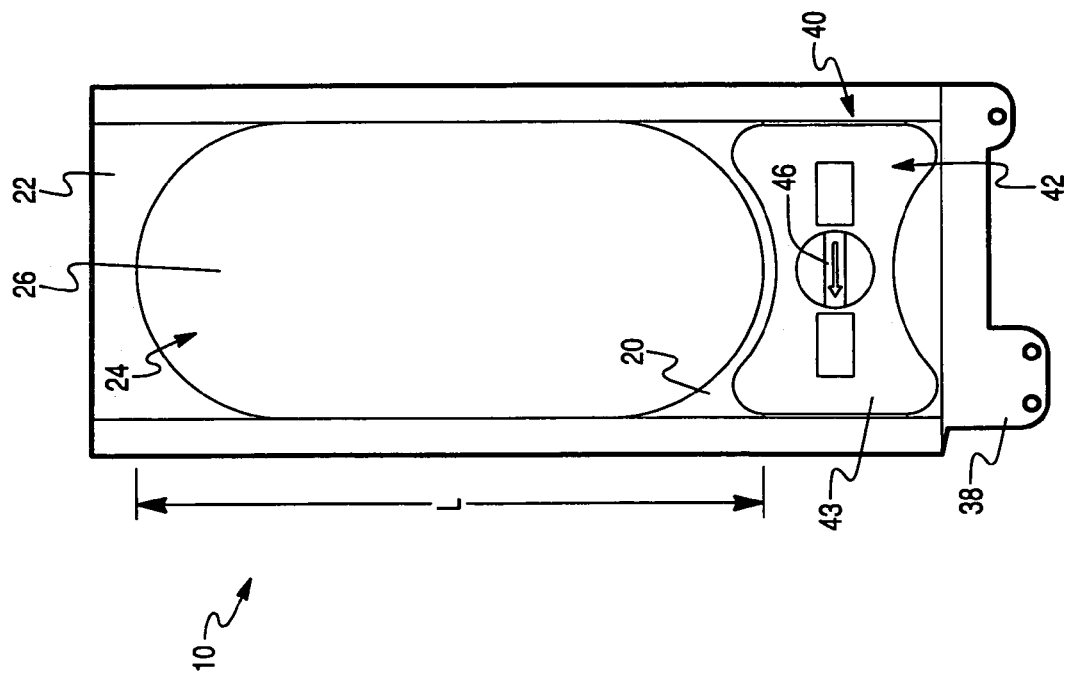

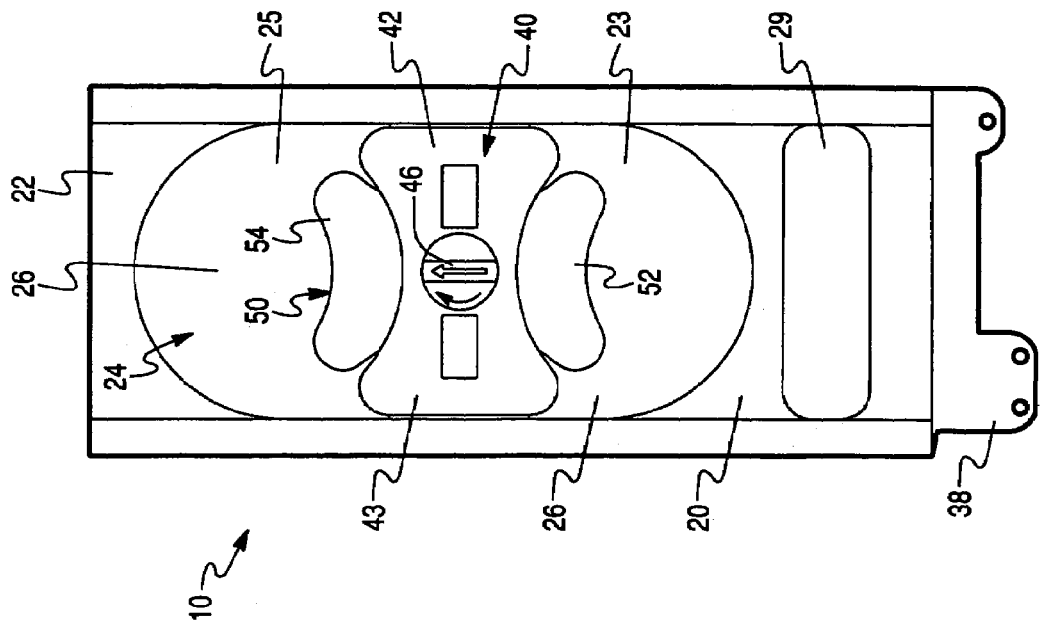
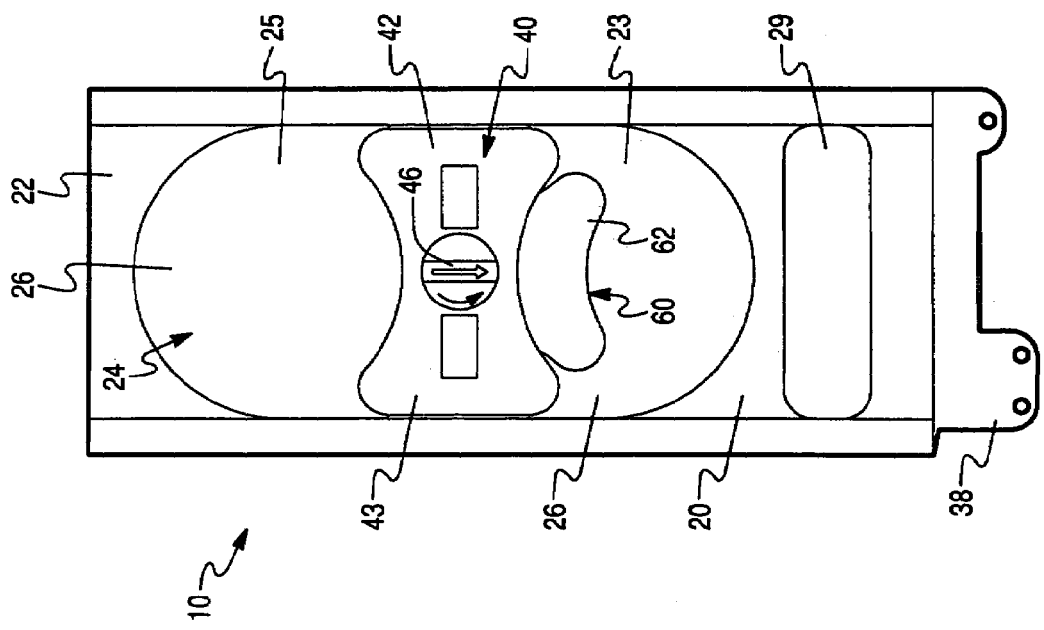

SLIDING/ADJUSTING CONTAINER HOLDER

BACKGROUND

The present invention relates generally to the field of container holders for vehicles.

Conventional container holders may be positioned in a center console of a vehicle. Such conventional container holders generally hold various beverage containers, such as cans and paper cups, which may vary in size and diameter.

Conventional container holders may be adjustable to allow for the various sized containers. The conventional container holders may comprise a box-like member with a compartment and a holding member to divide the compartment into two areas. Generally, such conventional container holders have a second member that pivots to adjust the size of the two areas.

SUMMARY

One drawback of these conventional container holders is that they have limited positions or dimensional capabilities. For example, the container holder disclosed in U.S. Pat. No. 6,039,296 (hereby incorporated by reference herein in its entirety) only allows the divided container holder to alter between a large opening in both areas or a small opening in both areas, thus requiring each area to be of equal diameter. Such a configuration does not permit two different sized containers to be properly stored at the same time.

Accordingly, it is an object of the invention to provide a container holder that permits different sized containers to be adequately held at the same time.

One embodiment of the invention relates to a container holder for a vehicle. The container holder comprises a container bin unit with a cavity, the cavity comprising a first portion and a second portion; and an adjustment mechanism. The adjustment mechanism comprises a dual adjustment piece movable between at least a retracted position and an extended position; and a single adjustment piece movable between at least a retracted position and an extended position.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 4 is a top view of the container holder in the starting position.

FIG. 5 is a top view of the container holder in the end position.

FIG. 6 is a top view of the container holder with a single adjustment piece in the extended position.

FIG. 7 is a top view of the container holder with a dual adjustment piece in the extended position.

DETAILED DESCRIPTION OF EMBODIMENTS OF THE INVENTION

Figure 1:
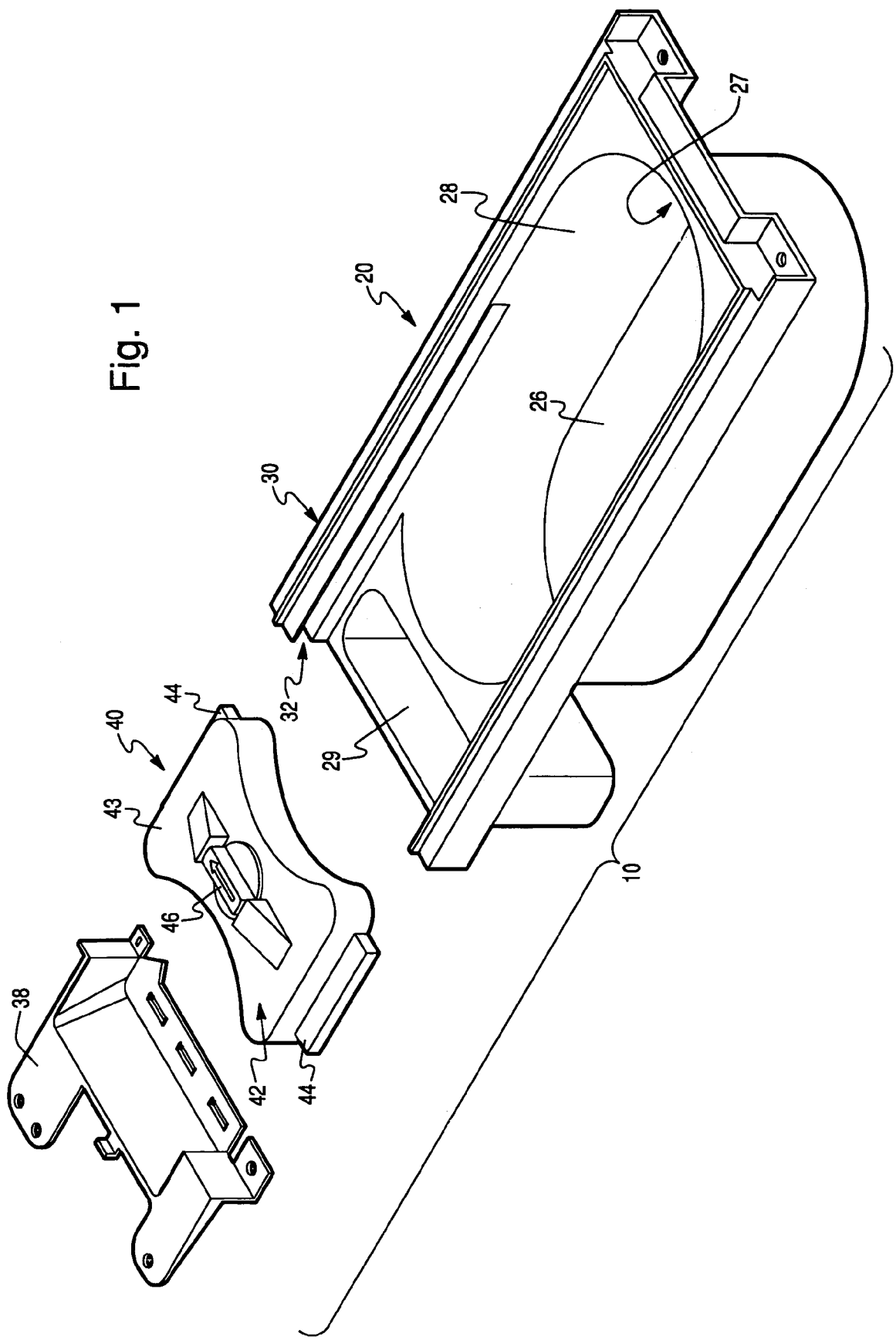
FIG. 1 is an exploded view of a container holder according to an embodiment of the invention.

Reference will now be made in detail to embodiments of the invention, examples of which are illustrated in the accompanying drawings.

"Approximately" as it is used herein, generally refers to a variation of up to 20% from a given value and is meant to allow for error inherent in measurement and manufacturing techniques and tolerances.

FIGS. 1-7 show an apparatus, referred to as a container holder 10, for a vehicle. The container holder 10 shown in, for example, FIG. 1, includes a container bin unit 20 and a sliding piece 42 with a size adjustment mechanism 40.

The container holder 10 is configured to hold a container such as a cup or drink or any other similarly shaped or sized article. Additionally, the container holder 10 can hold a plurality of such articles. The container holder 10 can be positioned in a vehicle in a center console between the driver and front passenger seats, or any other suitable location.

The container bin unit 20 includes a top surface 22 and a cavity 24, which extends below the top surface 22. Side walls 28, floor 26 and end wall 27 define the cavity 24. A track 30 is positioned along the top surface 22 of the container bin unit 20.

The container bin unit 20 can also include a storage section 29. The storage section 29 is positioned at an end of the container bin unit 20. The storage section 29 is configured to allow a user to store miscellaneous items. Additionally, the storage section 29 is configured to be the resting or storage location for the sliding piece 42 when in the starting position (described below).

The track 30 allows the sliding piece 42 to slide between a starting position and an end position. Within the interior sides of the track 30 is a groove 32 capable of receiving an arm 44 from the sliding piece 42 (discussed below). The arm 44 fits into the groove 32 and allows the sliding piece 42 to slide when moved by a user. The track 30 may extend the length of the container bin unit 20, or only extend a portion of the length of the bin unit 20. For example, the track 30 can extend to the middle of the container bin unit 20.

The sliding piece 42 has a top surface 43 with a groove 48 or slot that extends through the sliding piece 42. Above the groove 48, a dial 46 is attached to the sliding piece 42. The dial 46, a component of the size adjustment mechanism 40, is configured to allow a user to adjust the size or diameter of portions 23, 25 of the cavity 24. The dial 46 includes a pin 47 that extends into the groove 48. When a user turns the dial 46, the pin 47 rotates within the groove 48. Groove 48 includes a middle detent 48B that holds the dial 46 in a center position in the groove 48.

The sliding piece 42 is capable of sliding along the length of the container bin unit 20. The sliding piece 42 gives the user the option of having a general bin or a container holder(s). When the sliding piece 42 is in the starting position, the sliding piece 42 is positioned above the storage section 29 of the container bin unit 20, as shown in FIG. 4. In this starting position, the container bin unit 20 can have a general bin or cavity 24 for storing a variety of articles. When the sliding piece 42 slides or moves along the length of the container bin unit 20, the sliding piece 42 divides the cavity 24 into a first cavity portion 23 and a second cavity portion 25 as can be seen in FIG. 5. The first 23 and second 25 cavity portions can vary in size. The size of each of the portions 23, 25 is determined by the position of sliding piece 42. The sliding piece 42 can slide or move along the entire length of track 30.

Figure 2:
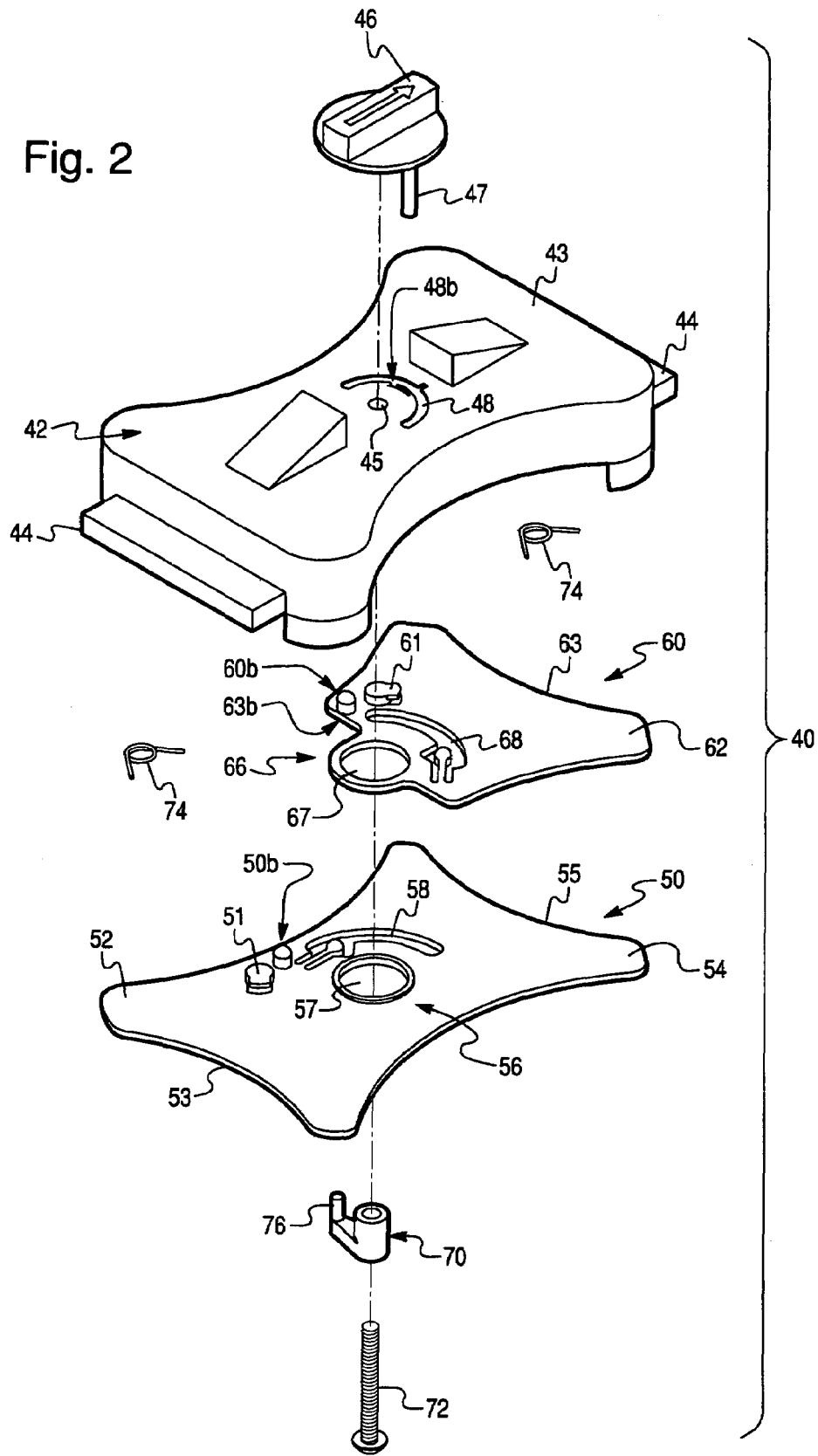
FIG. 2 is an exploded view of an adjustment mechanism of the container holder.

The sizes of the first 23 and second 25 cavity portions can be additionally varied by the size adjustment mechanism 40, which is shown in FIG. 2. The size adjustment mechanism 40 includes a dual adjustment piece 50 and a single adjustment piece 60, as shown in FIG. 2. The dual adjustment piece 50 and the single adjustment piece 60 are each capable of moving between a retracted and extended position.

The size adjustment mechanism 40 can adjust the sizes of the first 23 and second 25 cavity portions. The cavity portions 23, 25 can be adjusted such that the first cavity portion 23 is smaller than the second cavity portion 25, or the first 23 and second 25 cavity portions are both small (decreased in diameter), or the first 23 and second 25 cavity portions are both large (maintain their original diameter).

The dual adjustment piece 50 includes a first extending portion 52, a second extending portion 54 and a connecting portion 56. The connecting portion 56 connects the dual adjustment piece 50 to the adjustment mechanism 40.

The single adjustment piece 60 is superposed on the dual adjustment piece 50. In this position, the connection portion 66 of the single adjustment piece 60 is superposed on top of the connection portion 56 of the dual adjustment piece 50.

The single 60 and dual 50 adjustment pieces are moved by a turning of the dial 46. As the dial 46 is turned in a first direction, the single adjustment piece 60 is moved into the extended position, as shown in FIG. 6. The single adjustment piece 60 can be returned to the retracted position by moving the dial 46 back in the opposite direction. If the dial 46 is turned in a second direction, shown in FIG. 7, the dual adjustment piece 50 is moved into the extended position. The dual adjustment piece 50 can be returned to the retracted position by moving the dial 46 back in the opposite direction. For example, by turning the dial 46 approximately 90° in the first direction from a neutral, starting position (FIGS. 4 and 5), the single adjustment piece 60 moves into the extended position. The single adjustment piece 60 moves back into the retracted position when the dial 46 is moved back approximately 90° to the neutral position. Turning the dial 46 approximately 90° from the neutral position in the second direction moves the dual adjustment piece 50 into the extended position. Moving the dial 46 approximately 90° back to the neutral position moves the dual adjustment piece 50 back to the retracted position.

The adjustment mechanism can further include two springs 74. Each generally "L" shaped spring 74 is connected between the sliding piece 42 and the dual 50 or single 60 adjustment pieces for aid in moving the adjustment pieces 50, 60. When the dual adjustment piece 50 is in a retracted position, the spring 74 urges the dual adjustment piece 50 to the retracted position. When the dual adjustment piece 50 is moved to an extended position, the spring 74 is designed so that the biasing force changes at a point between the retracted and extended positions so that the spring 74 becomes biased in the extended position. The spring 74 allows the dual 50 and single 60 adjustment pieces to be retained in the desired positions, either retracted or extended. The single adjustment piece 60 also contains a spring 74 that works identically. When the single adjustment piece 60 is in a retracted position, the spring 74 urges the single adjustment piece 60 to the retracted position. When the single adjustment piece 60 is moved to an extended position, the spring 74 is designed so that the biasing force changes at a point between the retracted and extended positions so that the spring 74 becomes biased in the extended position. The spring can be similar to that disclosed in U.S. Pat. No. 6,039,296 (hereby incorporated by reference herein in its entirety).

Figure 3:
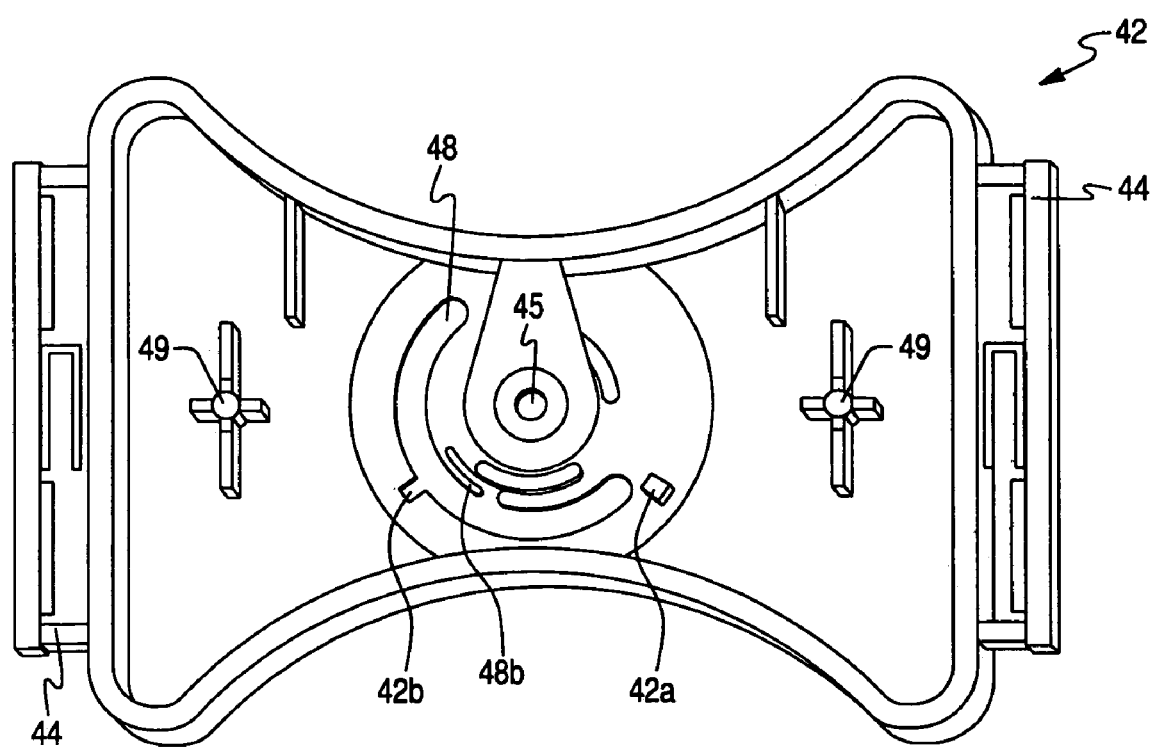
FIG. 3 is a rear view of a sliding piece of the container holder.

The spring 74 for the dual adjustment piece 50 is connected to the underside of the sliding piece 42. A first free end of the spring 74 attaches to a spring receiving protrusion 51 and a second free end of the spring 74 attaches to a connector 49 on the sliding piece 42, as shown in FIG. 3. When the dual adjustment piece 50 is in the retracted position, the spring 74 remains attached at these two points 51, 49 and the bias keeps the dual adjustment piece 50 in its proper location. The center coil of the spring 74 is positioned generally between the spring receiving protrusion 51 and connector 49 and is not directly attached to any part of the adjustment mechanism 40. When a user turns the dial 46 to move the dual adjustment piece 50 to an extended position, a connector 76 of a connecting pin 70 pushes against an end of the groove 58 pushing the dual adjustment piece 50, and the spring 74, with its connection points 51, 49, allowing the dual adjustment piece 50 to move. The dual adjustment piece 50 moves until pin 50B comes into contact with a tab 42A depending from sliding piece 42. Tab 42A, shown in FIG. 3, provides the stop position for the movement of the dual adjustment piece 50. The center coil of the spring 74 also moves when dual adjustment piece 50 moves. The center coil of the spring 74 moves to remain positioned generally between protrusion 51 and connector 49.

Likewise, the spring 74 for the single adjustment piece 60 is connected to the underside of the sliding piece 42. A first free end of the spring 74 attaches to a spring receiving protrusion 61 and a second free end of the spring 74 attaches to a connector 49 on the rear side of sliding piece 42 shown in FIG. 3. When the single adjustment piece 60 is in the retracted position, the spring 74 remains attached at these two points 61, 49 and the bias keeps the single adjustment piece 60 in its proper location. When a user turns the dial 46 to move the single adjustment piece 60 to an extended position, pin 47 pushes against an end of groove 68, pushing the single adjustment piece 60, and the spring 74 with its connection points 61, 49 allow the single adjustment piece 60 to move. The single adjustment piece 60 moves until pin 60B comes into contact with a tab 42B depending from sliding piece 42, as can be seen in FIG. 3.

Connector 76 does not extend into groove 68. Rather, the connector 76 only extends through groove 58, and an end of the connector 76 rests adjacent an end 63b of the single adjustment piece 60. Pin 47 only extends through groove 48 in the sliding piece 42 and in groove 68 in the single adjustment mechanism 60. The pin 47 keeps the single adjustment piece 60 in place when the dial 46 is turned in a second direction by sliding along the groove 68 while the connector 76 of the connecting pin 70 pushes against an end of groove 58, which moves the dual adjustment piece 50 into the extended position. When the dial 46 is turned in a first direction to extend the single adjustment piece 60, pin 47 pushes against an end of groove 68 pushing the single adjustment piece 60, and connector 76 slides in the groove 58 of the dual adjustment piece 50.

The size adjustment mechanism 40, according to this embodiment, is held together by a fastener 72. The fastener 72 extends up through openings 57, 67 in the dual 50 and single 60 adjustment pieces and up through an opening 45 in the sliding piece 42. The fastener is threadably attached to the dial 46 through a receiving hole (not shown), thus securing the size adjustment mechanism 40. The fastener 72 also attaches to the connecting pin 70.

When the dual adjustment piece 50 is in the retracted position, as shown in FIGS. 1, 4, 5 and 6, the first 52 and second 54 extending portions are positioned underneath the sliding piece 42 and perpendicular to the length L of the cavity 24. In this retracted position, the size of the cavity 24, including the first 23 and second 25 cavity portions, is not affected by the dual adjustment piece 50.

When the dual adjustment piece 50 is in the extended position, as shown in FIG. 7, the first 52 and second 54 extending portions extend out from the sliding piece 42 and are parallel to the length L of the cavity 24. When extended, the first extending portion 52 extends into one of the first 23 and second 25 cavity portions, and the second extending portion 54 extends into the other of the first 23 and second 25 cavity portions. In this extended position, the first 23 and second 25 cavity portions are reduced in size, thus allowing for a smaller container to be held in a more stable manner. The first 52 and second 54 extending portions each include an edge 53, 55. The edges 53, 55 are configured to receive a container that rests or abuts against the dual extending piece 50.

The single adjustment piece 60 includes the extending portion 62 and the connecting portion 66. The connecting portion 66 connects the single adjustment piece 60 to the adjustment mechanism 40 and to the sliding piece 42.

When the single adjustment piece 60 is in the retracted position, as shown in FIGS. 1, 4, 5 and 7, the extending portion 62 is positioned underneath the sliding piece 42 and is perpendicular to the length L of the cavity 24. In this retracted position, the size of the cavity 24, including the first 23 and second 25 cavity portions, is not affected by the single adjustment piece 60.

When the single adjustment piece 60 is in the extended position, the dual adjustment piece 50 remains in the retracted position. Alternatively, when the dual adjustment piece 50 is in the extended position, the single adjustment piece 60 remains in the retracted position.

When the single adjustment piece 60 is in the extended position, as shown in FIG. 6, the extending portion 62 extends out from the sliding piece 42 and is parallel to the length L of the cavity 24. When extended, the extending portion 62 extends into the first cavity portion 23. In this extended position, the first cavity portion 23 is reduced in size, thus allowing for a smaller container to be held in a more stable manner in that smaller cavity. The extending portion 62 includes an edge 63. The edge 63 is configured to receive a container that rests or abuts against the single extending piece 60.

The container holder 10 also includes a spacer piece 38, as shown in FIG. 1. The spacer piece 38 is located at an end of the container bin unit 20, adjacent the starting position of the adjustment mechanism 40. The spacer piece 38 is attached at the end of the container bin unit 20 to position the adjustment mechanism 40, including the sliding piece 42, in the proper location and to prevent the adjustment mechanism 40 from sliding out of the track 30.

According to another embodiment, any other suitable mechanism capable of allowing the sliding piece 42 to move along the length of the container bin unit 20 may be used.

The dual adjustment piece 50, in another embodiment, can be positioned on top of the single adjustment piece 60. In this position, the connecting portion 56 of the dual adjustment piece 50 is superposed on top of the connection portion 66 of the single adjustment piece 60.

In another embodiment, the connecting pin 70 can be removed from the fastener 72. In a further embodiment, any other suitable fastening device can be used to hold together the size adjustment mechanism 40.

It will be recognized that any combination of embodiments, or elements from various embodiments may be used in another embodiment of the present invention.

Given the disclosure of the present invention, one versed in the art would appreciate that there are other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined with reference to the following claims.

What is claimed is:

1. A storage device for a vehicle, comprising:
    a bin including a cavity formed therein, the cavity including a side wall structure including a first side wall and a second side wall defining an opening of the cavity; and
    an adjustment mechanism, the adjustment mechanism including
        a body member selectively positionable to extend from the first side wall across to the second side wall of the opening, the body member moveable between a stowed position and a usage position, and, in the usage position, the body member divides the opening into a first storage opening and a second storage opening;
        a dual adjustment member coupled to the body member, the dual adjustment member being rotatable between a retracted position in which portions of the dual adjustment member are retracted, and an extended position in which the portions of the dual adjustment member extend relative to the body member into the first and second storage openings thereby decreasing an effective opening of the first and second storage openings; and
        a single adjustment member coupled to the body member, the single adjustment member being rotatable between a retracted position in which a portion of the single adjustment member is retracted, and an extended position in which the portion of the single adjustment member extends relative to the body member into only one of the first or second storage openings thereby decreasing an effective opening of the one of the first or second storage openings.

2. The storage device according to claim 1, wherein when the body member is in the stowed position the opening of the cavity is substantially unobstructed, and when the body member is in the usage position the adjustment mechanism divides the opening into the first and second storage openings.

3. The storage device according to claim 2, wherein the body member slides between the stowed position and the usage position.

4. The storage device according to claim 2, further comprising a second cavity formed proximally to the cavity in the bin.

5. The storage device according to claim 4, wherein the adjustment mechanism covers the second cavity when the body member is in the stowed position.

6. The storage device according to claim 1, wherein the dual adjustment member is concealed by the body member when the dual adjustment member is in the retracted position.

7. The storage device according to claim 1, wherein the single adjustment member is concealed by the body member when the single adjustment member is in the retracted position.

8. A storage device for a vehicle, comprising:
    a container bin unit having a bottom surface and a wall structure including a first side wall and a second side wall surrounding the bottom surface, the wall structure having an upper surface defining an opening; and
a slidable adjustment mechanism, the adjustment mechanism including:
  a body member selectively positionable to extend from the first side wall and across to the second side wall of the opening, the body member slidable between a stowed position and a usage position, and, in the usage position, the body member divides the opening into a first storage opening and a second storage opening; and
  a single adjustment member, the single adjustment member being rotatable between a retracted position in which a portion of the single adjustment member is retracted, and an extended position in which a portion of the single adjustment member extends relative to the body member into only one of the first or second storage openings thereby decreasing the effective opening of the one of the first or second storage openings;
wherein the adjustment mechanism further comprises a dual adjustment member, the dual adjustment member being rotatable between a retracted position and an extended position in which portions of the dual adjustment member extend relative to the body member into the first and second storage openings thereby decreasing the effective opening of the first and second storage openings.

9. The storage device according to claim 8, wherein the single adjustment member includes an arcuate outer edge.

10. The storage device according to claim 9, wherein a radius of curvature of the arcuate outer edge is substantially similar to a radius of curvature of an arcuate edge of the body member.

11. The storage device according to claim 8, wherein opposite ends of the opening are substantially semi-circular.

12. An article holder for a vehicle comprising:
  a container holding bin including a bottom surface and a wall structure surrounding the bottom surface, the wall structure having an upper surface defining a receiving aperture;
  a sliding member movable between a stowed position and a usage position, and dividing the receiving aperture into two container receiving apertures when in the usage position;
  a first rotating member coupled to the sliding member, the first rotating member being movable between a retracted position and an extended position, the first rotating member extending into both container receiving apertures when in the extended position thereby decreasing the effective opening of both container receiving apertures; and
  a second rotating member coupled to the sliding member, the second rotating member being movable between a retracted position and an extended position, the second rotating member extending into only one of the container receiving apertures when in the extended position thereby decreasing the effective opening of the one of the container receiving apertures.

13. The article holder of claim 12, further comprising a second holding bin adjacent to the container holding bin, the second holding bin including a second bottom surface and a second wall structure surrounding the second bottom surface, the second wall structure including a second upper surface defining a second receiving aperture.

14. The article holder of claim 13, wherein the sliding member conceals the second receiving aperture when the sliding member is in the stowed position.

15. The article holder of claim 12, wherein the container holding bin includes at least one track formed adjacent to the receiving aperture.

16. The article holder of claim 15, wherein the sliding member includes at least one arm.

17. The article holder of claim 16, wherein the at least one arm slidingly engages the at least one track such that the sliding member is capable of sliding along a length of the track to move between the stowed and usage positions.

18. The article holder of claim 12, wherein the sliding member conceals the first and second rotating members when the first and second rotating members are in the retracted position.

19. The article holder of claim 12, further comprising a dial member rotatably coupled to the sliding member, wherein the dial member engages the first rotating member and the second rotating member.

20. The article holder of claim 19, wherein the first and second rotating members are in the retracted position when the dial member is in a first position.

21. The article holder of claim 20, wherein the dial member moves the first rotating member when the dial member rotates from the first position to a second position, and the dial member moves the second rotating member when the dial member rotates from the first position to a third position.

22. The article holder of claim 21, wherein the dial member moves the first rotating member from the retracted position to the extended position when the dial member rotates from the first position to the second position.

23. The article holder of claim 21, wherein the dial member moves the first rotating member from the extended position to the retracted position when the dial member rotates from the second position to the first position.

24. The article holder of claim 21, wherein the dial member moves the second rotating member from the retracted position to the extended position when the dial member rotates from the first position to the third position.

25. The article holder of claim 21, wherein the dial member moves the second rotating member from the extended position to the retracted position when the dial member rotates from the third position to the first position.

26. The article holder of claim 21, wherein the dial member rotates 90° in the clockwise direction when rotated from the first to the second position.

27. The article holder of claim 21, wherein the dial member rotates 90° in the counter-clockwise direction when rotated from the first to the third position.

28. The article holder of claim 12, wherein the first and second rotating members are capable of moving into the extended position only when the sliding member is in the usage position.

29. The article holder of claim 12, further comprising a spring, the spring including a first free end attached to a receiving protrusion on the first rotating member and a second free end attached to a connector on an underside of the sliding member.

30. The article holder of claim 12, further comprising a spring, the spring including a first free end attached to a receiving protrusion on the second rotating member and a second free end attached to a connector on an underside of the sliding member.

* * * * *